US009963129B2

(12) United States Patent
Betz et al.

(10) Patent No.: US 9,963,129 B2
(45) Date of Patent: May 8, 2018

(54) CONTROL DEVICE FOR A BRAKING SYSTEM OF A VEHICLE, AND METHOD FOR OPERATING A BRAKING SYSTEM OF A VEHICLE (71) Applicant: Robert Bosch GmbH, Stuttgart (DE)

(72) Inventors: Christoph Betz, Moeglingen (DE); Michael Reichert, Freiberg am Neckar (DE); Michael Bunk, Leingarten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 45 days.

(21) Appl. No.: 14/771,851

(22) PCT Filed: Jan. 10, 2014

(86) PCT No.: PCT/EP2014/050383
§ 371 (c)(1),
(2) Date: Sep. 1, 2015

(87) PCT Pub. No.: WO2014/135290
PCT Pub. Date: Sep. 12, 2014

(65) Prior Publication Data
US 2016/0009258 A1 Jan. 14, 2016

(30) Foreign Application Priority Data
Mar. 6, 2013 (DE) .................. 10 2013 203 824

(51) Int. Cl.
B60T 8/17 (2006.01)
B60T 13/66 (2006.01)

(52) U.S. Cl.
CPC .............. B60T 8/17 (2013.01); B60T 13/66 (2013.01); B60T 2270/604 (2013.01)

(58) Field of Classification Search
None
See application file for complete search history.

(56) References Cited

U.S. PATENT DOCUMENTS 6,345,869 B1    2/2002   Matsuo et al.
8,874,341 B2   10/2014   Crombez et al.
(Continued)

FOREIGN PATENT DOCUMENTS

DE   10 2011 075983   11/2012
JP      H08175360 A    7/1996
(Continued)

Primary Examiner — Mussa A Shaawat
Assistant Examiner — Kyung J Kim
(74) Attorney, Agent, or Firm — Norton Rose Fulbright US LLP; Gerard Messina (57) ABSTRACT A control device for a vehicle braking system including an electronic device to control at least one first hydraulic component and second hydraulic component of the braking system so that a first brake pressure in at least one first wheel brake cylinder of a first brake circuit of the braking system is settable corresponding to a predefined first setpoint brake pressure or a setpoint brake pressure profile, and a second brake pressure is settable in at least one second wheel brake cylinder of a second brake circuit of the braking system corresponding to a predefined second setpoint brake pressure or setpoint brake pressure profile, the electronic device being configured to select an operating mode to be performed from at least two workable operating modes based on at least one provided specified variable. Also described is a braking system for a vehicle and a method for operating a vehicle braking system.

15 Claims, 8 Drawing Sheets (56) References Cited

U.S. PATENT DOCUMENTS

| | | | |
|---|---|---|---|
| 8,926,027 B2 | 1/2015 | Shimada | |
| 9,221,437 B2 | 12/2015 | Stenger( et al. | |
| 2011/0160972 A1 | 6/2011 | Crombez et al. | |
| 2012/0112525 A1* | 5/2012 | Shimada | ................. B60T 7/042 303/10 |

FOREIGN PATENT DOCUMENTS

| | | |
|---|---|---|
| JP | 3704985 B2 | 10/2005 |
| JP | 2012081923 A | 4/2012 |
| JP | 2014-514209 A | 6/2014 |
| WO | WO 92/18361 | 10/1992 |
| WO | 2010/092939 A1 | 8/2010 |
| WO | 2010/119889 A1 | 10/2010 |

* cited by examiner

CONTROL DEVICE FOR A BRAKING SYSTEM OF A VEHICLE, AND METHOD FOR OPERATING A BRAKING SYSTEM OF A VEHICLE

FIELD OF THE INVENTION

The present invention relates to a control device for a braking system of a vehicle. Moreover, the present invention relates to a braking system for a vehicle. In addition, the present invention relates to a method for operating a braking system of a vehicle.

BACKGROUND INFORMATION

Patent document DE 10 2011 075 983 A1 discusses a hydraulic braking system, a control device and a method for operating same. With the aid of a use of the hydraulic braking system, it is to be made possible to decelerate a vehicle with the aid of at least one electric motor and a hydraulic braking system.

SUMMARY OF THE INVENTION

The present invention provides a control device for a braking system of a vehicle having the features described herein, a braking system for a vehicle having the features described herein, and a method for operating a braking system of a vehicle having the features described herein.

The present invention enables the use/selection of an optimized control strategy for operating the braking system. The operating mode which is most advantageous regarding a driving comfort and/or an energy efficiency may be selected from at least two operating modes. Examples for specific control strategies, from which the selected operating mode may be selected, are explained in greater detail below. The present invention thereby ensures a comfortable and energy-efficient deceleration of a vehicle.

As explained in greater detail below, different control strategies may be made available for selection, it being possible to switch in a targeted manner between the different control strategies/operating modes. In this way, a maximum possible recuperation via a per-axle blending at optimal comfort, in particular due to a noise suppression, is also implementable.

In a braking system there are generally multiple possibilities for executing a pressure buildup, a pressure maintenance, or a pressure reduction in at least one of the brake circuits. For example, a braking system often includes a master brake cylinder pressure varying device, with the aid of which a master brake cylinder internal pressure is variable independently of a driver braking force exerted on a brake actuating element, or taking the driver braking force into account. Such a master brake cylinder pressure varying device may, for example, include at least one plunger and/or a brake booster. Taking the instantaneous driver braking force into account or independently of the driver braking force, an assistance force may be exerted, in particular with the aid of an electromechanical brake booster, on at least one adjustable piston of the master brake cylinder in such a way that the master brake cylinder internal pressure is additionally increased or reduced. Furthermore, a braking system generally includes wheel inlet valves and wheel outlet valves with the aid of which a transfer of brake fluid between the master brake cylinder and the wheel brake cylinders of the braking system is controllable. In addition, a braking system often includes at least one switchover valve, at least one high-pressure switchover valve, and/or at least one pump, with the aid of which a variation of the brake pressure present in the at least one wheel brake cylinder is also possible.

With the aid of the present invention, the disadvantage of hydraulic components often generating interfering/undesirable noises may be eliminated. Instead, the present invention ensures a noise-optimized choice in a targeted manner of the operating mode used, a good recuperation efficiency, a high dynamic and a reliable pressure setting accuracy being ensured at the same time.

The present invention makes use of the advantage that when implementing a blending of braking torques, multiple degrees of freedom regarding a possible use of the hydraulic components of the braking system are present. In this way, the first brake pressure present in the at least one first wheel brake cylinder of the first brake circuit and the second brake pressure present in the at least one second wheel brake cylinder of the second brake circuit may be implemented in a very different manner. With the aid of the optimized operating mode, the disadvantages of the operating modes not selected may be avoided.

In one advantageous specific embodiment of the control device, the electronic device is configured to take into account a vehicle type of the vehicle, a driving situation, a traffic situation and/or a surroundings condition as the at least one provided specified variable. For example, the operating mode optimized specifically with regard to the vehicle type may be selected in which, due to the arrangement/configuration of the hydraulic components of the braking system, it is ensured that at least one hydraulic component generating noise is used comparatively rarely/never and/or only in a noise-optimized, output-reduced operation.

The electronic device may be configured to control at least one plunger, at least one pump, at least one wheel inlet valve, at least one wheel outlet valve, at least one high-pressure switchover valve and/or at least one switchover valve as the first component and/or the second component. In addition, a brake booster, such as in particular an electromechanical brake booster, may also be controllable with the aid of the electronic device. The control device may thus make use of components already installed in a braking system. Thus it is not necessary to provide additional units/devices at a braking system acting together with the control device.

In another advantageous specific embodiment, the electronic device is configured to operate the braking system in a wheel outlet valve-using operating mode selected from the at least two workable operating modes in such a way that a master brake cylinder internal pressure in a master brake cylinder of the braking system equals a maximum of the first brake pressure and that the second brake pressure is settable with the aid of the at least one activated plunger, and the first brake pressure or the second brake pressure is at least reducible with the aid of the at least one activated wheel outlet valve compared to the master brake cylinder internal pressure. In this way, in a noise-optimized installation/configuration of the wheel outlet valves, this noise-optimized wheel outlet valve-using operating mode may be used for ensuring the desired brake pressures.

Alternatively or additionally, the electronic device may be configured to operate the braking system in a pump-using operating mode selected from the at least two workable operating modes in such a way that the master brake cylinder internal pressure is settable with the aid of the at least one activated plunger to be equal to a minimum of the first brake pressure and the second brake pressure, and the first brake pressure or the second brake pressure is increasable compared to the master brake cylinder internal pressure at least with the aid of the at least one activated pump. This mode is particularly exceptionally suitable in a noise-optimized arrangement/configuration of the at least one pump for setting the desired brake pressures.

The electronic device may also be configured to operate the braking system in a plunger-using operating mode selected from the at least two workable operating modes in such a way that the first brake pressure and the second brake pressure are increasable simultaneously, by the master brake cylinder internal pressure being settable to be equal to the maximum of the first brake pressure and the second brake pressure being settable with the aid of the at least one activated plunger, and the first brake pressure and the second brake pressure being reducible simultaneously by the master brake cylinder internal pressure being settable with the aid of the at least one activated plunger to be equal to the minimum of the first brake pressure and of the second brake pressure. As explained in greater detail below, with the aid of such a plunger-using operating mode, a use of a pump or of a wheel outlet valve may be dispensed with in a targeted manner.

Furthermore, the electronic device may also be configured in one advantageous specific embodiment to operate the braking system in a plunger-using operating mode selected from the at least two workable operating modes in such a way that the first brake pressure and the second brake pressure are increasable simultaneously, by the master brake cylinder internal pressure being settable with the aid of the at least one activated plunger to be greater than the maximum of the first brake pressure and of the second brake pressure, and the first brake pressure and the second brake pressure being simultaneously reducible by the master brake cylinder internal pressure being settable with the aid of the at least one activated plunger to be less than the minimum of the first brake pressure and the second brake pressure. Optionally, the use of a pump or a wheel outlet valve may be (almost) dispensed with in such an additional operating mode.

The advantages explained in the previous paragraphs are also ensured in a braking system for a vehicle having such a control device.

In addition, the explained advantages may be realized by executing the corresponding method for operating a braking system of a vehicle. It is pointed out that the method for operating a braking system of a vehicle according to the specific embodiments above may be further refined.

Further features and advantages of the present invention are explained below with reference to the figures.

DETAILED DESCRIPTION

FIGS. 1A through 1G show coordinate systems and diagrams for illustrating one specific embodiment of the method for operating a braking system of a vehicle.

FIGS. 1A through 1Ga show coordinate systems whose abscissas are a time axis t, and whose ordinates represent a pressure p. In the coordinate systems of FIG. 1Aa through 1Ga, a first brake pressure p1 set/controlled in at least one first wheel brake cylinder of a first brake circuit of the braking system and a second brake pressure p2 set/controlled in at least one second wheel brake cylinder of a second brake circuit of the braking system are plotted. Furthermore, a master brake cylinder internal pressure pHZ set/controlled in a master brake cylinder of the braking system is also plotted in the coordinate systems of FIGS. 1Aa through 1Ga.

Each of the brake circuits of the braking system may include two wheel brake cylinders, for example. However, the method described below is not limited to the connection of a certain number of wheel brake cylinders to the first brake circuit or to the second brake circuit.

The first brake circuit may be the front axle brake circuit, for example, while the second brake circuit may be usable as the rear axle brake circuit. However, the practicability of the method is not limited to this division of the brake circuits. Furthermore, the wheels assigned to one brake circuit may also be situated at one shared side or diagonally at the vehicle.

Figure 1:
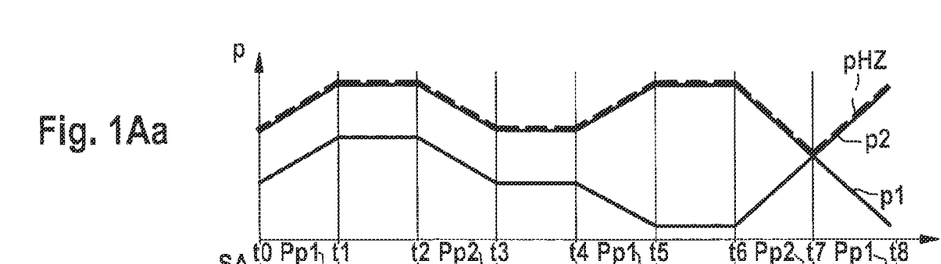
FIGS. 1A, 1B, 1C, 1D, 1E, 1F and 1G show coordinate systems and diagrams for illustrating one specific embodiment of the method for operating a braking system of a vehicle.

The diagrams shown in FIGS. 1Ab through 1Gb represent a frequency of use and/or a carried out output of different hydraulic components of the braking system. The abscissas of the diagrams of FIG. 1Ab through 1Gb are again time axis t. The hydraulic components of the braking system represented with their frequency of use and/or their output with the aid of FIGS. 1Ab through 1Gb are at least one plunger SA as an example for at least one usable master brake cylinder pressure varying device SA, at least one pump P per brake circuit, at least one first wheel inlet valve EV1 of the first brake circuit, at least one second wheel inlet valve EV2 of the second brake circuit, at least one first wheel outlet valve AV1 of the first brake circuit, at least one second wheel outlet valve AV2 of the second brake circuit, one first switchover valve USV1 of the first brake circuit, one second switchover valve USV2 of the second brake circuit, one first high pressure switchover valve HSV1 of the first brake circuit and one second high-pressure switchover valve HSV2 of the second brake circuit. However, it is pointed out that the practicability of the method described in the following is not limited to equipping the braking system with all of these components.

When carrying out the method for operating a braking system of a vehicle, an operating mode to be carried out is selected in a first method step from at least two workable operating modes of the braking system for varying first brake pressure p1 (in the at least one first wheel brake cylinder of the first brake circuit) and second brake pressure p2 (in the at least one second wheel brake cylinder of the second brake circuit). Each of the at least two workable operating modes is suitable for varying first brake pressure p1 (in the at least one first wheel brake cylinder) according to a predefined first setpoint brake pressure and/or setpoint brake pressure profile and for varying second brake pressure p2 (in the at least one second brake pressure cylinder) according to a predefined second setpoint brake pressure and/or a setpoint brake pressure profile.

The first setpoint brake pressure/setpoint brake pressure profile and/or the second setpoint brake pressure/setpoint brake pressure profile may be predefined by a driver of the vehicle with the aid of an actuation of a brake actuating element of the vehicle and/or by an automatic speed control device of the vehicle. For example, the first setpoint brake pressure/brake pressure profile and/or the second setpoint brake pressure/setpoint brake pressure profile may be set/ predefined taking a driver braking force into account or an adjustment travel of the brake actuating element, for example, a rod travel.

Varying first brake pressure p1 according to the predefined first setpoint brake pressure and/or the setpoint brake pressure profile may be understood as that first brake pressure p1 (in the at least one first wheel brake cylinder) is increased, held constant, or reduced in such a way that first brake pressure p1 is/becomes (almost) equal to an instantaneous value of the predefined first setpoint brake pressure and/or setpoint brake pressure profile. Accordingly, the varying of second brake pressure p2 according to a predefined second setpoint brake pressure and/or a setpoint brake pressure profile is to be understood as such an increase, holding constant, or reduction of second brake pressure p2 that second brake pressure p2 (present in the at least one second wheel brake cylinder) is/remains (almost) equal to an instantaneous value of the predefined second setpoint brake pressure and/or a setpoint brake pressure profile.

The selection of the operating mode to be carried out from the at least two workable operating modes in the first operating step takes place taking at least one provided specified variable into account. For example, when selecting the operating mode to be carried out, a vehicle type of the vehicle, a driving situation, a traffic situation and/or a surroundings condition may be taken into account as the at least one provided specified variable. A type of at least one component of the braking system, a state of at least one component of the braking system, a pressure present in at least one hydraulic component of the braking system and/or a brake fluid volume present in at least one hydraulic component of the braking system may be taken into account as a specified variable. For example, a pressure difference between the two brake pressures p1 and p2 as the at least one specified variable may be taken into account. Similarly, a filling volume of at least one storage chamber of the braking system may also be taken into account as the at least one specified variable. The at least one specified variable may be continuously re-ascertained with the aid of at least one sensor. Alternatively or additionally thereto, the at least one specified variable may also be programmed at an installation of a device carrying out the method and/or may be retrieved from a vehicle on-board data memory unit.

The method described here enables the use/selection of an operating mode for operating the braking system optimized with regard to the at least one specified variable. The operating mode which is most advantageous regarding a driving comfort and/or an energy efficiency may be selected from at least two operating modes. The present invention thereby ensures a comfortable and energy-efficient deceleration of a vehicle. As explained in greater detail below, in particular the operating mode may be selected from the at least two workable operating modes which ensures the most noiseless deceleration of the vehicle for the vehicle type of the vehicle, or for the present installation of the different hydraulic components of the braking system. The at least one specified variable is in this case may be the vehicle type, or a piece of information regarding the spatial arrangement of the different hydraulic components of the braking system. However, it is to be noted that such a specific embodiment of the method is only to be interpreted as an example. The method may also be carried out for realizing other advantages.

The at least two workable operating modes of the braking system are to be understood to mean at least one first workable operating mode and one second workable operating mode. It is ensured here that when operating the braking system in the first workable operating mode, brake pressure p1 in the at least one first wheel brake cylinder (corresponding to the predefined first setpoint brake pressure and/or to the setpoint brake pressure profile) and second brake pressure p2 in the at least one second wheel brake cylinder (corresponding to the predefined second setpoint brake pressure and/or to the setpoint brake pressure profile) are reliably controlled/set. This takes place by using/operating at least one first hydraulic component of the braking system with at least one first frequency and/or one first output and one second hydraulic component of the braking system with a second frequency and/or at a second output. Accordingly, when operating the brake pressure in the second workable operating mode, first brake pressure p1 (corresponding to the first setpoint brake pressure and/or the setpoint brake pressure profile) in the at least one first wheel brake cylinder and second brake pressure p2 (corresponding to the second setpoint brake pressure and/or the setpoint brake pressure profile) are set/controlled in the at least one second wheel brake cylinder, by using at least the first hydraulic component at a lower frequency than the first frequency and/or at a lower output than the first output and the second hydraulic component with a higher frequency than the second frequency and/or a higher output than the second output. This may also be understood to mean that of the two hydraulic components in the first operating mode only the first hydraulic component and/or in the second operating mode only the second hydraulic component is/are used. It is pointed out here that despite the different outputs and/or frequencies of use of the two hydraulic components, the same pressure values are settable/controllable for each of brake pressures p1 and p2 in all different selectable operating modes.

In the specific embodiment shown with the aid of FIGS. 1A through 1G, the operating mode to be carried out may be selected from seven workable operating modes of the braking system. However, it is to be noted that this number of workable operating modes and their configuration, described in the following, are only to be interpreted as examples.

In a second method step, the braking system is operated in the selected operating mode in such a way that first brake pressure p1 is set in the at least one first wheel brake cylinder (corresponding to the first setpoint brake pressure and/or to the setpoint brake pressure profile) and second brake pressure p2 is set in the at least one second wheel brake cylinder (according to the second setpoint brake pressure and/or to the setpoint brake pressure profile). As is apparent when comparing FIGS. 1Aa through 1AGa, the same values are set for first brake pressure p1 and second brake pressure p2 independently of the respectively selected operating mode. It is thus always ensured, independently of the operating mode, that the driver's braking intent or the brake demand of the automatic speed control device is reliably fulfilled.

For carrying out the second method step, the at least one plunger SA (as an example for the at least one master brake cylinder pressure varying device), the at least one pump P per brake circuit (all pumps being operable with the aid of a shared motor), the currentlessly open wheel inlet valves EV1 and EV2, the currentlessly closed wheel outlet valves AV1 and AV2, the currentlessly closed high-pressure switching valves HSV1 and HSV2, and the currentlessly open switching valves USV1 and USV2 (as at least the first hydraulic component and the second hydraulic component) are used/controlled in the specific embodiment shown here. For carrying out the method, it is thus possible to use hydraulic components which are generally present anyway in a braking system. However, the practicability of the method is not limited to a use of (all) hydraulic components of the braking system shown in FIGS. 1Ab through 1Gb.

The profiles/values for brake pressures p1 and p2 shown in FIGS. 1Aa through 1Ga are only to be interpreted as examples:

Between times t0 and t1, first brake pressure p1 and second brake pressure p2 (optionally with the same slope) increase steadily, first brake pressure p1 being/remaining higher than second brake pressure p2. Beginning at time t1, brake pressures p1 and p2 remain constant for a predefined time interval. Only beginning at time t2 do first brake pressure p1 and second brake pressure p2 decrease steadily until time t3 (optionally with an equal slope), first brake pressure p1 being/remaining higher than second brake pressure p2. Brake pressures p1 and p2 remain constant between times t3 and t4. Beginning at time t4, higher first brake pressure p1 is increased, while lower brake pressure p2 is reduced. Between times t5 and t6, first brake pressure p1 and second brake pressure p2 are held constant. Starting at time t6, higher first brake pressure p1 is reduced while lower second brake pressure p2 is increased so that brake pressures p1 and p2 have the same value at time t7. Thereafter, the slope of second brake pressure p2 is continued until time t8, while first brake pressure p1 is reduced simultaneously. However, it is again to be noted that the ability to carry out the method is not limited to certain pressure profiles for brake pressures p1 and p2.

In the following, examples for the workable operating modes are presented, from which the operating mode to be carried out may be selected. The method may, however, also be carried out when at least one of the examples explained in the following is omitted and/or one other workable operating mode is added.

In FIGS. 1Aa and 1Ab, a wheel outlet valve-using operating mode is shown in which the braking system is operated provided that the wheel outlet valve-using operating mode is selected from the at least two workable operating modes. For operating the braking system in the wheel outlet valve-using operating mode, the master brake cylinder internal pressure pHZ in the master brake cylinder is set to be equal to a maximum of first brake pressure p1 and second brake pressure p2 with the aid of the at least one plunger SA. For this purpose, the at least one plunger SA is activated between times t0 and t1, between times t4 and t5, and between times t7 and t8 in such a way that the master brake cylinder internal pressure pHZ is increased with a first plunger output Pp1 of the at least one plunger SA corresponding to the increasing maximum of brake pressures p1 and p2 (to be set). In addition, master brake cylinder internal pressure pHZ is controlled between times t2 and t3 and between times t6 and t7 in such a way that master brake cylinder internal pressure pHZ is reduced with a second plunger output Pp2 of the at least one plunger SA corresponding to the decreasing maximum of brake pressures p1 and p2 (to be set).

Between times t0 and t7, second brake pressure p2 (to be set) is lower than master brake cylinder internal pressure pHZ. To reduce second brake pressure p2 compared to master brake cylinder internal pressure pHZ, the at least one second wheel inlet valve EV2 of the second brake circuit is thus controlled/at least temporarily controlled into the closed state (by energization) between times t0 and t7. Moreover, the at least one second wheel outlet valve AV2 of the second brake circuit is controlled/at least temporarily opened by energization between times t2 and t3 and between times t4 and t5. Accordingly, first brake pressure p1 is reduced compared to the master brake cylinder internal pressure pHZ between times t7 and t8 by controlling at least temporarily the at least one first wheel inlet valve EV1 of the first brake circuit into the closed state and the at least one first wheel outlet valve AV1 of the first brake circuit at least temporarily into the opened state with the aid of the energization.

In the wheel outlet valve-using operating mode shown in FIGS. 1Aa and 1Ab, mainly wheel outlet valves AV1 and AV2 are used relatively often. In contrast, it is not necessary to control the at least one pump P per brake circuit in the wheel outlet valve-using operating mode. The wheel outlet valve-using operating mode shown in FIGS. 1Aa and 1Ab is thus suitable mainly when prioritizing a use of wheel outlet valves AV1 and AV2 over a use of the at least one plunger SA and when prioritizing a use of the at least one plunger SA over a use of the at least one pump P per brake circuit. In particular when an operation of the at least one pump P per brake circuit is associated with undesirable noises, the wheel outlet valve-using operating mode may be used to avoid a pump operation.

FIGS. 1Ba and 1Bb represent a first pump-using operating mode in which the braking system is operated after selecting the first pump-using operating mode from the at least two workable operating modes. While operating the braking system in the first pump-using operating mode, master brake cylinder internal pressure pHZ is set to be equal to a minimum of first brake pressure p1 and brake pressure p2 with the aid of the at least one plunger SA. For this purpose, during times t0 and t1 and during times t6 and t7, master brake cylinder internal pressure pHZ is increased corresponding to the increasing minimum of brake pressures p1 and p2 (to be set) with the aid of the at least one plunger SA operated with first plunger output Pp1. Moreover, between times t2 and t3, between times t4 and t5 and between times t7 and t8, master brake cylinder internal pressure pHZ is reduced with the aid of the at least one plunger SA operated with second plunger output Pp2 corresponding to the decreasing minimum of brake pressures p1 and p2 (to be set).

Between times t0 and t7, a first brake pressure p1 increased compared to master brake cylinder internal pressure pHZ is ensured by controlling/at least temporarily controlling first switchover valve USV1 with the aid of an energization into the closed state. Moreover, first brake pressure p1 is increased between times t0 and t1 and between times t4 and t5 by activating the at least one pump P per brake circuit and energizing first high-pressure switchover valve HSV1. Accordingly, second brake pressure p2 may also be increased compared to master brake cylinder internal pressure pHZ between times t7 and t8 with the aid of operating the at least one pump P per brake circuit, controlling/energizing second switchover valve USV2 and controlling/energizing second high-pressure switchover valve HSV2.

The first pump-using operating mode is mainly advantageous when an operation of the at least one pump P per brake circuit may be used, while an operation of wheel outlet valves AV1 and AV2 is denied. As is apparent from FIGS. 1Ba and 1Bb, energizing wheel outlet valves AV1 and AV2 is not necessary during the shown method steps.

A second pump-using operating mode is shown in FIGS. 1Ca and 1Cb. When operating the braking system in the second pump-using operating mode, master brake cylinder internal pressure pHZ is set/maintained at (virtually) zero. In order to ensure a master brake cylinder internal pressure pHZ of (virtually) zero, the brake booster, for example, may be controlled in such a way that despite actuating the brake actuating element by the driver, a braking into the master brake cylinder is prevented. Similarly, a free travel between the brake actuating element and at least one piston of the master brake cylinder may be present so that despite actuating the brake actuating element, braking into the master brake cylinder is prevented. With the aid of both possibilities, a pressure buildup in the master brake cylinder is reliably preventable despite the actuation of the brake actuating element.

In order to set desired brake pressures p1 and p2, first switchover valve USV1 and second switchover valve USV2 are energized during the entire time interval between times t0 and t8. Increasing at least one of brake pressures p1 or p2 takes place with the aid of operating the at least one pump P per brake pressure between times t0 through t1, t4 through t5, and t6 through t8. In order for the operation of the at least one pump P per brake circuit to effectuate an increase of first brake pressure p1 and/or of second brake pressure p2, high-pressure switchover valve HSV1 and/or HSV2 of the at least one brake circuit, having brake pressure p1 and/or p2 to be increased, is energized. (By non-energizing one of high-pressure switchover valves HSV1 or HSV2, an increase of brake pressures p1 or p2 in the respective brake circuit may be prevented despite the joint operation of pumps P.)

The second pump-using operating mode ensures the omission of a use of the at least one plunger SA and of wheel outlet valves AV1 and AV2 during all shown method steps. This is particularly advantageous if an operation of the at least one pump may be used instead of an operation of the at least one plunger SA or of wheel outlet valves AV1 and AV2.

FIGS. 1Da, 1Db, 1Ea and 1Eb show different plunger-using operating modes in which the braking system may be operated after selecting the plunger-using operating mode in question from the at least two workable operating modes. In the two plunger-using operating modes, a simultaneous increase of first brake pressure p1 and second brake pressure p2 takes place between times t0 and t1 by setting master brake cylinder internal pressure pHZ to be equal to the maximum of brake pressures p1 and p2 (to be set) with the aid of the at least one plunger SA operated with first plunger output Pp1. In order to ensure between times t0 and t2a second brake pressure p2 lower than first brake pressure p1 and master brake cylinder internal pressure pHZ, the at least one second wheel inlet valve EV2 of the second brake circuit is controlled/at least temporarily controlled into a closed state by energization. A joint reduction of first brake pressure p1 and second brake pressure p2 between times t2 and t3 takes place by setting master brake cylinder internal pressure pHZ to be equal to the minimum of brake pressures p1 and p2 (to be set) with the aid of the at least one plunger SA. With the aid of controlling/energizing first switchover valve USV1 it may be prevented between times t2 and t4 that first brake pressure p1 decreases to second brake pressure p2 and master brake cylinder internal pressure pHZ.

However, the methods shown with the aid of FIGS. 1Da, 1Db, 1Ea and 1Eb require a significantly increased plunger output Pph of the at least one plunger SA during a switch between a joint increase/holding constant of brake pressures p1 and p2 and a joint reduction of brake pressures p1 and p2. (Plunger output Pph may be significantly above first plunger output Pp1 and second plunger output Pp2.) The two plunger-using operating modes are thus advantageous if an output-intensive operation of the at least one plunger SA with plunger output Pph causes hardly any/no (transmittable) noise due to a configuration of the at least one plunger SA.

The first plunger-using operating mode shown in FIGS. 1Da and 1Db uses a first control strategy between times t4 through t8 for increasing only one brake pressure p1 or p2 during a simultaneous reduction of the other brake pressure p1 or p2. During this process, master brake cylinder internal pressure pHZ is increased, reduced or held constant at a minimum of brake pressures p1 and p2 to be set. In order to ensure that first brake pressure p1 is/remains greater between times t4 and t7 than master brake cylinder internal pressure pHZ, first switchover valve USV1 is activated/controlled into its closed state with the aid of energization. In order to increase first brake pressure p1 only, the pumps are activated between times t4 and t5. By energizing first high-pressure switchover valve HSV1 it is ensured that the operation of the at least one pump P per brake circuit effectuates (only) an increase of first brake pressure p1 between times t4 and t5.

Accordingly, second switchover valve USV2 and second high-pressure switchover valve HSV2 are energized and closed between times t7 and t8 in order to increase only second brake pressure p2 with the aid of the operation of pumps P.

In the case of the second plunger-using operating mode shown in FIGS. 1Ea and 1Eb, a different control strategy is carried out between times t4 and t8. When increasing only brake pressure p1 or p2 during a simultaneous reduction of other brake pressure p1 or p2, master brake cylinder internal pressure pHZ is controlled corresponding to the maximum of the two brake pressures p1 and p2 (to be set). For example, master brake cylinder internal pressure pHZ is controlled between times t4 and t7 to first brake pressure p1 (to be set). In order to ensure a lower second brake pressure p2 between times t4 and t7, the at least one second wheel inlet valve EV2 is controlled/at least temporarily closed via energization in the second plunger-using operating mode. Reducing second brake pressure p2 takes place between times t4 and t5 by energizing for the at least temporary opening of the at least one second wheel outlet valve AV2. An increase of second brake pressure p2 is also possible between times t6 and t7, by at least temporarily reopening a second wheel inlet valve EV2. Between times t7 and t8, master brake cylinder internal pressure pHZ is controlled to be equal to second brake pressure p2, while first brake pressure p1 is reduced by at least temporarily controlling/energizing the at least one first wheel inlet valve EV1 and at least temporarily controlling/energizing the at least one first wheel outlet valve AV1.

The second plunger-using operating mode shown with the aid of FIGS. 1Ea and 1Eb is mainly suitable when an operation of the at least one pump P of each brake circuit may be prevented. Avoiding an operation of the at least one pump P is possible by instead using wheel inlet valves EV1 and EV2 and wheel outlet valves AV1 and AV2 more frequently and operating the at least one plunger more frequently with the significantly higher plunger output Pph.

In the plunger-using operating modes shown in FIGS. 1Fa, 1Fb, 1Ga and 1Gb, first brake pressure p1 and second brake pressure p2 are increased simultaneously by setting master brake cylinder internal pressure pHZ to be (significantly) higher than the maximum of first brake pressure p1 and second brake pressure p2 with the aid of the at least one plunger SA. Setting the different brake pressures p1 and p2 in the respective brake circuits takes place by controlling/energizing wheel inlet valves EV1 and EV2. For simultaneously reducing first brake pressure p1 and second brake pressure p2, master brake cylinder internal pressure pHZ is set to be significantly lower than the minimum of first brake pressure p1 and second brake pressure p2 with the aid of the at least one plunger SA. This requires a significantly increased plunger output Pph of the at least one plunger SA mainly in the case of a switch between an increase/holding constant of brake pressures p1 and p2 and a reduction of brake pressures p1 and p2. In order to set different brake pressures p1 and p2, switchover valves USV1 and USV2 are activated/energized during times t2 and t4.

The plunger-using operating modes shown with the aid of FIGS. 1Fa, 1Fb, 1Ga and 1Gb are mainly suitable if an output-intensive operation of the at least one plunger SA is accepted over a pump operation or an operation of the wheel outlet valves. At least one cost-effective plunger SA, which is suitable only for an approximate setting of master brake cylinder internal pressure pHZ, may be used in particular for carrying out the plunger-using operating modes. When selecting the carried out operating mode, a type of the at least one hydraulic component may thus also be taken into account.

Between times t4 and t8, the plunger-using operation modes from FIGS. 1Fa, 1Fb, 1Ga and 1Gb carry out different control strategies. In the first plunger-using operating mode from FIGS. 1Fa and 1Fb, the increase of only one of brake pressures p1 and p2 takes place with the aid of an operation of the at least one pump P between times t4 and t5 and between times t6 and t8. In order to ensure that one of brake pressures p1 or p2 is increased, the respective high-pressure switchover valve HSV1 or HSV2 of the brake circuit is energized/activated with brake pressure p1 or p2 to be increased between times t4 and t5 and between times t6 and t8. A fine tuning of brake pressures p1 and p2 may be carried out with the aid of an energization of switchover valves USV1 and USV2 between times t4 and t8. The operating mode from FIGS. 1Fa and 1Fb is thus particularly suitable if an operation of the at least one pump per brake circuit is prioritized over a use of wheel outlet valves AV1 or AV2.

In the operating mode of FIGS. 1Ga and 1Gb, the increase of only one of brake pressures p1 and p2 takes place by setting master brake cylinder internal pressure pHZ to a value (significantly) above the maximum of brake pressures p1 and p2 (to be set). In order to reduce the other brake pressures p1 and p2, the wheel outlet valves AV1 or AV2 assigned to the respective wheel brake cylinders are activated. A fine tuning of brake pressures p1 and p2 takes place between times t4 and t8 by controlling/energizing wheel inlet valves EV1 and EV2.

In the operating mode from FIGS. 1Ga and 1Gb, an operation of the at least one pump P per brake circuit may thus be completely omitted in all shown method steps. The operating mode from FIGS. 1Ga and 1Gb is thus mainly suitable, if due to a configuration/arrangement of pumps P their operation is associated with a noise which is significantly better perceivable than a corresponding operation of the at least one plunger SA or of wheel outlet valves AV1 and AV2.

Figure 2:
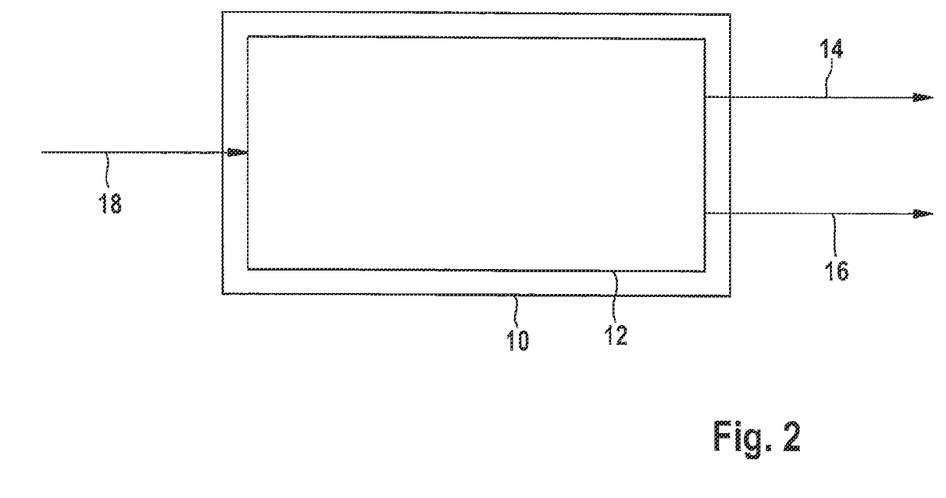
FIG. 2 shows a schematic representation of one specific embodiment of the control device.

FIG. 2 shows a schematic representation of one specific embodiment of the control device.

Control device 10 schematically illustrated in FIG. 2 is usable in conjunction with a braking system (not shown) of a vehicle. Control device 10 includes an electronic device 12 which is configured to control at least one first hydraulic component of the braking system with the aid of at least one first control signal 14 and one second hydraulic component of the braking system with the aid of at least one second control signal 16. With the aid of control signals 14 and 16, the braking system is operable in at least one first workable operating mode. In one first workable operating mode, at least the controlled first hydraulic component is useable with a first frequency and/or a first output and the controlled second hydraulic component with a second frequency and/or a second output in such a way that a first brake pressure in at least one first wheel brake cylinder of a first brake circuit of the braking system is settable corresponding to a predefined first setpoint brake pressure and/or setpoint brake pressure profile, and a second brake pressure in at least one second wheel brake cylinder of a second brake circuit of the braking system is settable corresponding to a predefined second setpoint brake pressure and/or setpoint brake pressure profile.

Moreover, the electronic device is also configured to operate the braking system activated with the aid of control signals 14 and 16 in at least one second workable operating mode. In one second workable operating mode, at least the controlled first hydraulic component is useable with a frequency lower than the first frequency and/or with an output lower than the first output and the controlled second hydraulic component with a frequency higher than the second frequency and/or with an output higher than the second output also in such a way that the (equal) first brake pressure in the at least one first wheel brake cylinder is settable (corresponding to the equal predefined first setpoint brake pressure and/or setpoint brake pressure profile) and that the (equal) second brake pressure in the at least one second wheel brake cylinder is settable (corresponding to the equal predefined second setpoint brake pressure and/or the setpoint brake pressure profile.)

In addition, electronic device 12 is additionally configured to select an operating mode to be carried out from the at least two workable operating modes taking at least one provided specified variable 18 into account, and to operate the braking system in the selected operating mode in such a way that the first brake pressure in the at least one first wheel brake cylinder and the second brake pressure in the at least one second wheel brake cylinder are settable. Control device 10 therefore also ensures the above-described advantages.

Electronic device 12 may be configured to take into account a vehicle type of the vehicle equipped with the control device, a driving situation, a traffic situation and/or a surroundings condition as the at least one provided specified variable 18. Additional examples for the at least one provided specified variable 18 have already been listed above. Electronic device 12 may be configured to control at least one plunger, at least one pump (per brake circuit), at least one wheel inlet valve, at least one wheel outlet valve, at least one high-pressure switchover valve and/or at least one switchover valve as the first component and/or the second component. The exemplary embodiments listed here for the controllable hydraulic components are, however, to be interpreted as examples only.

In one advantageous specific embodiment, electronic device 12 is configured to operate the braking system in a wheel outlet valve-using operating mode selected from the at least two workable operating modes in such a way that a master brake cylinder internal pressure in a master brake cylinder of the braking system is settable with the aid of the at least one activated plunger to be equal to a maximum of the first brake pressure and the second brake pressure, and the first brake pressure or the second brake pressure is at least reducible with the aid of the at least one activated wheel outlet valve compared to the master brake cylinder internal pressure. The electronic device may also be configured to operate the braking system in a pump-using operating mode selected from the at least two workable operating modes in such a way that the master brake cylinder internal pressure is settable with the aid of the at least one activated plunger to be equal to a minimum of the first brake pressure and the second brake pressure, and the first brake pressure or the second brake pressure is increasable compared to the master brake cylinder internal pressure at least with the aid of the at least one activated pump. Furthermore, the electronic device may be configured to operate the braking system in a plunger-using operating mode selected from the at least two workable operating modes in such a way that the first brake pressure and the second brake pressure are increasable simultaneously, by the master brake cylinder internal pressure being settable with the aid of the at least one activated plunger to be equal to the maximum of the first brake pressure and the second brake pressure, and the first brake pressure and the second brake pressure being reducible simultaneously by the master brake cylinder internal pressure being settable with the aid of the at least one activated plunger to be equal to the minimum of the first brake pressure and of the second brake pressure. The electronic device may additionally be configured to operate the braking system in a plunger-using operating mode selected from the at least two workable operating modes in such a way that the first brake pressure and the second brake pressure are increasable simultaneously by the master brake cylinder internal pressure being settable with the aid of the at least one activated plunger to be higher than the maximum of the first brake pressure and the second brake pressure, and the first brake pressure and the second brake pressure being reducible simultaneously by the master brake cylinder internal pressure being settable with the aid of the at least one activated plunger to be lower than the minimum of the first brake pressure and of the second brake pressure.

Control device 10 may be configured in such a way that all method steps listed above may be carried out with the aid of it. The practicability of control device 10 is not limited thereto.

The advantages of control unit 10 are also ensured in a braking system for a vehicle including control device 10. Control device 10, the braking system equipped with it, and the corresponding method provide at any time of a braking a situation-specific optimum of highest possible comfort, for example, lower noise emission and maximum possible recuperation efficiency. The comparatively free settability of the first brake pressure and the second brake pressure may be used to blend a chronologically varying generator braking torque of at least one electric motor usable as a generator. However, it is pointed out that the implementability of control device 10 and of the method is not limited to a regenerative braking system.

What is claimed is:

1. A control device for a braking system of a vehicle, comprising:
an electronic device to control at least one first hydraulic component of the braking system and a second hydraulic component of the braking system so that the braking system is operable in at least one first workable operating mode so that at least the controlled first hydraulic component is usable at a first frequency and/or at a first output and the controlled second hydraulic component at a second frequency and/or at a second output so that a first brake pressure is settable in at least one first wheel brake cylinder of a first brake circuit of the braking system corresponding to a predefined first setpoint brake pressure or setpoint brake pressure profile, and a second brake pressure in at least one second wheel brake cylinder of a second brake circuit of the braking system corresponding to a predefined second setpoint brake pressure or setpoint brake pressure profile;
wherein the electronic device is configured to operate the braking system in at least one second workable operating mode so that at least the controlled first hydraulic component is usable at a frequency lower than the first frequency and/or an output lower than the first output and the controlled second hydraulic component at a frequency higher than the second frequency and/or an output higher than the second output so that the first brake pressure is settable corresponding to the predefined first setpoint brake pressure or setpoint brake pressure profile in the at least one first wheel brake cylinder and the second brake pressure is settable corresponding to the predefined second setpoint brake pressure or setpoint brake pressure profile in the at least one second wheel brake cylinder, and
wherein the electronic device is configured to select an operating mode to be carried out from the at least two workable operating modes based on at least one provided specified variable, and to operate the braking system in the selected operating mode so that the first brake pressure in the at least one first wheel brake cylinder and the second brake pressure in the at least one second wheel brake cylinder are settable.

2. The control device of claim 1, wherein the electronic device is configured to take into account a vehicle type of the vehicle, a driving situation, a traffic situation and/or a surroundings condition as the at least one provided specified variable.

3. The control device of claim 1, wherein the electronic device is configured to control at least one plunger, at least one pump, at least one wheel inlet valve, at least one wheel outlet valve, at least one high-pressure switchover valve and/or at least one switchover valve as the first component and/or the second component.

4. The control device of claim 3, wherein the electronic device is configured to operate the braking system in a wheel outlet valve-using operating mode selected from the at least two workable operating modes so that a master brake cylinder internal pressure in a master brake cylinder of the braking system is settable with the at least one activated plunger to be equal to a maximum of the first brake pressure and the second brake pressure, and the first brake pressure or the second brake pressure is reducible with the at least one activated wheel outlet valve compared to the master brake cylinder internal pressure.

5. The control device of claim 3, wherein the electronic device is configured to operate the braking system in a pump-using operating mode selected from the at least two workable operating modes so that the master brake cylinder internal pressure is settable with the at least one activated plunger to be equal to a minimum of the first brake pressure and the second brake pressure, and the first brake pressure or the second brake pressure is increasable at least with the at least one activated pump compared to the master brake cylinder internal pressure.

6. The control device of claim 3, wherein the electronic device is configured to operate the braking system in a plunger-using operating mode selected from the at least two workable operating modes so that the first brake pressure and the second brake pressure are increasable simultaneously by the master brake cylinder internal pressure being settable with the at least one activated plunger to be equal to the maximum of the first brake pressure and the second brake pressure, and the first brake pressure and the second brake pressure being reducible simultaneously by the master brake cylinder internal pressure being settable with the at least one activated plunger to be equal to the minimum of the first brake pressure and of the second brake pressure.

7. The control device of claim 3, wherein the electronic device is configured to operate the braking system in a plunger-using operating mode selected from the at least two workable operating modes so that the first brake pressure and the second brake pressure are increasable simultaneously by the master brake cylinder internal pressure being settable with the at least one activated plunger to be higher than the maximum of the first brake pressure and the second brake pressure, and the first brake pressure and the second brake pressure being reducible simultaneously by the master brake cylinder internal pressure being settable with the at least one activated plunger to be lower than the minimum of the first brake pressure and of the second brake pressure.

8. A braking system for a vehicle, comprising:
a control device, including an electronic device to control at least one first hydraulic component of the braking system and a second hydraulic component of the braking system so that the braking system is operable in at least one first workable operating mode so that at least the controlled first hydraulic component is usable at a first frequency and/or at a first output and the controlled second hydraulic component at a second frequency and/or at a second output so that a first brake pressure is settable in at least one first wheel brake cylinder of a first brake circuit of the braking system corresponding to a predefined first setpoint brake pressure or setpoint brake pressure profile, and a second brake pressure in at least one second wheel brake cylinder of a second brake circuit of the braking system corresponding to a predefined second setpoint brake pressure or setpoint brake pressure profile;
wherein the electronic device is configured to operate the braking system in at least one second workable operating mode so that at least the controlled first hydraulic component is usable at a frequency lower than the first frequency and/or an output lower than the first output and the controlled second hydraulic component at a frequency higher than the second frequency and/or an output higher than the second output so that the first brake pressure is settable corresponding to the predefined first setpoint brake pressure or setpoint brake pressure profile in the at least one first wheel brake cylinder and the second brake pressure is settable corresponding to the predefined second setpoint brake pressure or setpoint brake pressure profile in the at least one second wheel brake cylinder, and
wherein the electronic device is configured to select an operating mode to be carried out from the at least two workable operating modes based on at least one provided specified variable, and to operate the braking system in the selected operating mode so that the first brake pressure in the at least one first wheel brake cylinder and the second brake pressure in the at least one second wheel brake cylinder are settable.

9. A method for operating a braking system of a vehicle including the steps:
selecting an operating mode to be carried out from at least two workable operating modes of the braking system for varying a first brake pressure in at least one first wheel brake cylinder of a first brake circuit of the braking system corresponding to a predefined first setpoint brake pressure or setpoint brake pressure profile and a second brake pressure in at least one second wheel brake cylinder of a second brake circuit of the braking system corresponding to a predefined second setpoint brake pressure or setpoint brake pressure profile taking into account at least one provided specified variable, the first brake pressure being set in the at least one first wheel brake cylinder and the second brake pressure being set in the at least one second wheel brake cylinder during an operation of the braking system in one first workable operating mode of the at least two workable operating modes, by using at least one first hydraulic component of the braking system at a first frequency and/or a first output, and a second hydraulic component of the braking system at a second frequency and/or a second output, the first brake pressure being set in the at least one first wheel brake cylinder and the second brake pressure being set in the at least one second wheel brake cylinder during an operation of the braking system in a second workable operating mode of the at least two workable operating modes by using at least the first hydraulic component at a frequency lower than the first frequency and/or an output lower than the first output and the second hydraulic component at a frequency higher than the second frequency and/or at an output higher than the second output; and
operating the braking system in the selected operating mode so that the first brake pressure is set in the at least one first wheel brake cylinder and the second brake pressure is set in the at least one second wheel brake cylinder.

10. The method of claim 9, wherein a vehicle type of the vehicle, a driving situation, a traffic situation and/or a surroundings condition is taken into account as the at least one provided specified variable.

11. The method of claim 9, wherein at least one plunger, at least one pump, at least one wheel inlet valve, at least one wheel outlet valve, at least one high-pressure switchover valve and/or at least one switchover valve is used as the first component and/or the second component.

12. The method of claim 11, wherein the braking system is operated in a wheel outlet valve-using operating mode selected from the at least two workable operating modes so that a master brake cylinder internal pressure in a master brake cylinder of the braking system is settable with the at least one activated plunger to be equal to a maximum of the first brake pressure and the second brake pressure, and the first brake pressure or the second brake pressure is reduced at least with the at least one wheel outlet valve compared to the master brake cylinder internal pressure.

13. The method of claim 11, wherein the braking system is operated in a pump-using operating mode selected from the at least two workable operating modes so that the master brake cylinder internal pressure is set with the at least one plunger to be equal to a minimum of the first brake pressure and the second brake pressure, and the first brake pressure or the second brake pressure is increased at least with the at least one pump compared to the master brake cylinder internal pressure.

14. The method of claim 11, wherein the braking system is operated in a plunger-using operating mode selected from the at least two workable operating modes so that the first brake pressure and the second brake pressure are increased simultaneously, by the master brake cylinder internal pressure being set with the at least one activated plunger to be equal to the maximum of the first brake pressure and the second brake pressure, and the first brake pressure and the second brake pressure being reduced simultaneously by the master brake cylinder internal pressure being set with the at least one plunger to be equal to the minimum of the first brake pressure and of the second brake pressure.

15. The method of claim 11, wherein the braking system is operated in a plunger-using operating mode selected from the at least two workable operating modes so that the first brake pressure and the second brake pressure are increased simultaneously, by the master brake cylinder internal pressure being set with the at least one plunger to be higher than the maximum of the first brake pressure and the second brake pressure, and the first brake pressure and the second brake pressure being reduced simultaneously by the master brake cylinder internal pressure being set with the at least one plunger to be lower than the minimum of the first brake pressure and the second brake pressure.

* * * * *